US005200152A

United States Patent [19]

Brown

[11] Patent Number: 5,200,152

[45] Date of Patent: Apr. 6, 1993

[54] MINIATURIZED BIOLOGICAL ASSEMBLY

[75] Inventor: James F. Brown, Clifton, Va.

[73] Assignee: Cytonix Corporation, Silver Spring, Md.

[21] Appl. No.: 632,655

[22] Filed: Dec. 27, 1990

Related U.S. Application Data

[60] Continuation-in-part of Ser. No. 375,700, Jul. 5, 1989, abandoned, which is a division of Ser. No. 174,163, Mar. 28, 1988, abandoned.

[51] Int. Cl.[5] .............................................. G01N 1/28

[52] U.S. Cl. ...................................... 422/102; 422/58; 422/61; 422/68.1; 436/46; 436/165; 436/809; 435/285; 435/301; 435/310; 435/810; 356/244

[58] Field of Search ................ 422/58, 68.1, 100, 102, 422/61, 101; 436/46, 165, 809; 356/244, 246; 435/285, 300, 301, 310, 810, 970

[56] References Cited

U.S. PATENT DOCUMENTS

| | | | |
|---|---|---|---|
| 3,690,836 | 9/1972 | Buissiere et al. | 422/102 X |
| 3,691,017 | 9/1972 | Brown et al. | 422/102 X |
| 4,088,448 | 5/1978 | Lilja et al. | 356/246 X |
| 4,387,990 | 6/1983 | Yazawa et al. | 422/58 X |
| 4,426,451 | 1/1984 | Columbus | 436/165 X |
| 4,596,695 | 6/1986 | Cottingham | 422/58 |
| 4,734,260 | 3/1988 | Lautenschlager | 422/58 |
| 4,753,531 | 6/1988 | Hiratsuka et al. | 356/246 |
| 4,818,493 | 4/1989 | Coville et al. | 422/102 |

*Primary Examiner*—Lynn M. Kummert
*Attorney, Agent, or Firm*—Watson, Cole, Grindle & Watson

[57] ABSTRACT

A miniature chamber assembly that provides a miniature capillary environment in which a liquid medium containing microscopic-size particulate material can be placed for study under a microscope. The assembly includes components which do not wet relative to the liquid medium. The assembly provides a miniaturized capillary environment that can contain the liquid medium for a period of time sufficient to enable observation while preventing deterioration of the medium.

17 Claims, 3 Drawing Sheets

MINIATURIZED BIOLOGICAL ASSEMBLY

This application is a continuation-in-part of application Ser. No. 375,700, filed Jul. 5, 1989, now abandoned which is a divisional application of application Ser. No. 174,163, filed Mar. 28, 1988 now abandoned.

BACKGROUND AND BRIEF SUMMARY OF THE INVENTION

This invention relates to the field of biological studies and the like, having particular reference to studies observed or recorded over a period of time under controlled conditions and while under magnification.

There are many instances where samples of biological material require study over a period of time and while the material is under magnification. For example, a semen sample may require study to determine both the sperm count in the liquid medium of the sample and the motility of the sperm being observed. This may be done by providing a sample on a microscope slide and observing it under magnification of, say, 100 x through a reference grid incorporated in the microscope objective. The grid may be divided into 100 squares and the sperm count in each of a representative number of squares may be made by a human observer to approximate the total number of sperm within the grid. Typically, the number of sperm observed within one square may be in the order of 100–200. Obviously, not every sperm in each square of the grid may be counted by the observer and a judicious selection is made as to which and how many of the squares are selected for accurate counting. The approximation is, therefore, highly subjective in nature. The other important factor to determine is sperm motility. This is determined by the observer by noting and counting the number of sperm which swim or are otherwise moving in the liquid medium within the selected and observed squares. The total number of sperm having such motility is again approximated to determine the percentage of the total which may be regarded as having motility.

In making the above determinations, it is essential that the volume of the semen sample observed in the confines of the grid be known and that the depth of such volumetric sample be such that the depth of the field of view permits all of the sperm within the confines of the grid to be observed. Although standard techniques have been developed to assure these factors during preparation of the slide sample, control over the factors which govern the volume of the sample confined to the grid area being observed and over deterioration of the sample is not uniform. Since body temperature is maintained in the sample during the study, evaporation of the liquid medium of the sample rapidly causes deterioration and it is difficult at best to prevent evaporation affecting the sample. In regard to this particular example, control over the location of the interface between the liquid medium and ambient air is important for control of evaporation. In accord with this invention, this control is effected by utilizing a miniaturized capillary environment which is wettable by the liquid medium of the sample. This is not easy to achieve because whereas many materials such as glass, for example, are wettable by water, they may not be sufficiently wettable by the biological liquid medium to achieve the desired and necessary miniaturized capillary environment. Mere selection of materials is inadequate because the desired wettability may not be present in any material unless it is specially prepared prior to use. That is, glass, for example, often and usually will possess surface film contamination which seriously affects its wettability characteristics and cannot be used as-received. Another problem is that a particular miniaturized capillary environment may require contiguous surface portions, one of which is highly wettable and the other of which is extremely hydrophobic. Again, mere selection of materials is inadequate and one may find that a conventional treatment of the miniaturized contiguous surfaces to control their surface energies or wettability characteristics results in chaos. For example, if the surface energy of one of the contiguous surfaces is to be increased while the other is to be decreased, conventional techniques may well result in an increase in both or a decrease in both so that the desired and correct combination of surface energies cannot be obtained.

Another example of biological study which may be desired is the study of a cell or a group or colony of cells again in some liquid medium. Here, the volumetric consideration may not be so important as in the above example, but it is still a consideration because miniaturized chambers to accept the biological material should be so sized that some degree of physical confinement of the cells is effected. Moreover, control over surface energy or surface energies is equally if not more important than in the above example, particularly as the study involved may well require the presence of a gas environment as well as liquid nutrients for the cell or cells, all within the miniaturized capillary environment.

In one aspect, the invention concerns the method of making a miniaturized assembly to facilitate magnification study of biological samples in a liquid medium, which comprises the steps of: forming components which are inadequate as to wettability, relative to the liquid medium, to define a capillary environment containing the sample for a time sufficient to prevent deterioration of the sample while it is being studied; altering the wettability of the components relative to the liquid medium so that they may define a capillary environment containing the sample for a time sufficient to prevent deterioration of the sample while it is being studied; and assembling the components to define the capillary environment.

The invention disclosed herein is also directed to a miniaturized assembly to facilitate study of microscopic size particulate material contained in a medium while under magnification in a field of view having a particular depth of field, the assembly comprising the combination of plate means for defining a chamber having a portion which is to be within the field of view and is wettable by the medium to cause introduction and stabilization of the medium and the particulate material therewithin, and means for controlling depth dimension of said portion of the chamber accurate to within 100 nanometers and the width dimension accurate to within 2 micrometers so as to correspond to the microscopic size of the particles and assure their disposition in the field of view. In terms of the study of semen as described above, the chamber containing the semen sample being observed may have a width dimension of 1.0 mm + or − 2 micrometers and a depth dimension of 10 micrometers + or − 100 nanometers. The width and depth dimensions assure an accurate determination of the volume being observed and the depth dimension is critical to assurance that all sperm being observed lie within the depth of field of the microscope under the magnification of interest.

More specifically, the invention relates to a system for microscopic evaluation of biological material contained in a field of view of a microscope, the biological material comprising discrete entities of the same kind dispersed in a medium, comprising the combination of first and second plates disposed in registry with each other, and means interposed between the plates for defining at least one biological evaluation chamber wettable by the medium and having a known set of dimensions which allows the determination the concentration of entities in the field of view.

The invention also involves the method of making a miniature chamber assembly to facilitate study of microscopic size particulate material contained in a medium while under magnification which comprises the steps of providing two glass plates and forming a thin film of photoresist material on a surface of at least one plate in which the film is of a thickness of 0.25–250 micrometers, exposing the thin film to a patterned image and removing film material from the glass plate to leave discrete portions of the film in accord with the pattern and to expose the glass, altering the patterned film to render it either unwettable by the medium by exposing it to a fluorine plasma, or wettable by the medium by exposing it to an oxygen plasma or by selectively applying a thin film of aluminum, and superimposing the second glass plate upon the patterned film to form a system of miniaturized chambers between the plates and bounded by the patterned film.

BRIEF DESCRIPTION OF THE DRAWING FIGURES

DETAILED DESCRIPTION OF THE INVENTION

Figure 1:
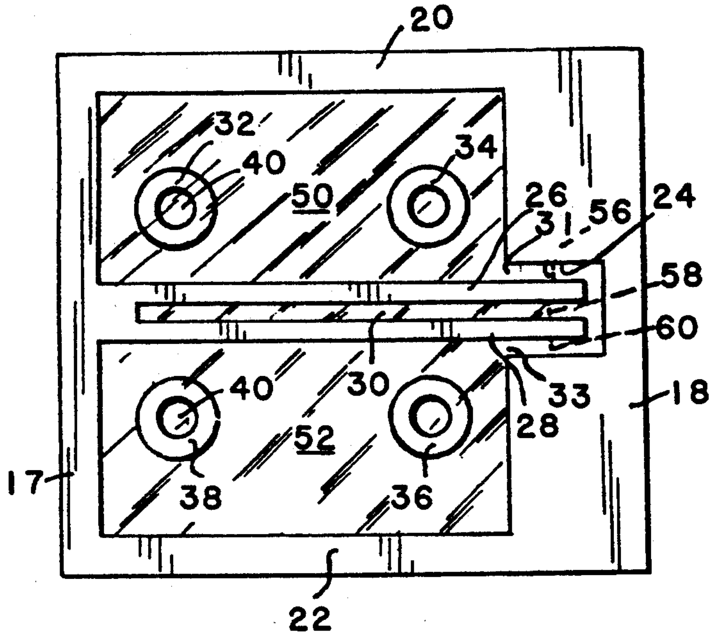
FIG. 1 is a plan view of a patterned component of an embodiment of the invention.
Figure 2:
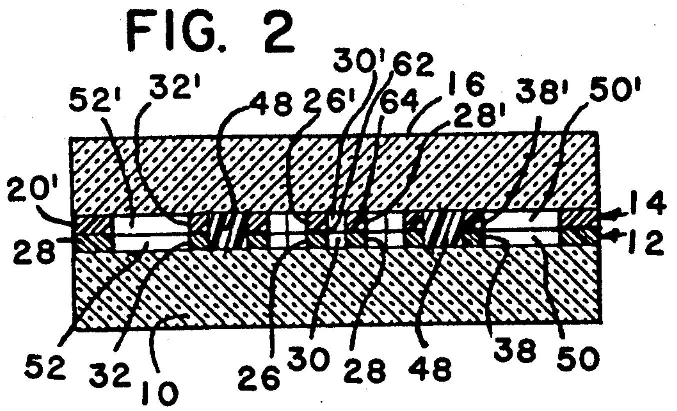
FIG. 2 is a sectional view of the embodiment partially illustrated in FIG. 1.
Figure 3:
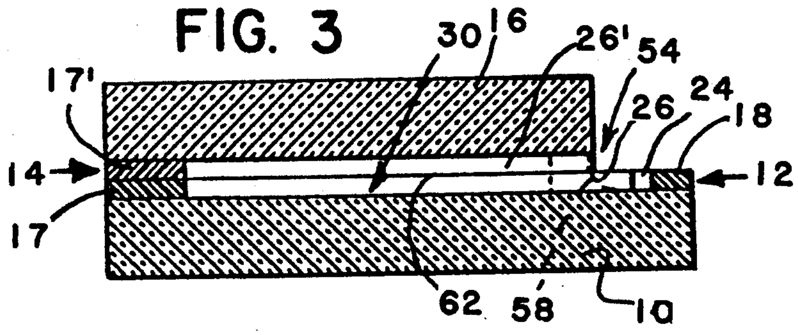
FIG. 3 is a transverse section through the embodiment of FIG. 1 and 2.

With reference to FIGS. 2 and 3, the glass substrate or bottom plate 10 is provided with a layer 12 of photoresist and the top plate 16 is provided with a layer 14 of photoresist and the two components are adhered together to form the completed assembly. None of the Figures is to scale so that the details of the miniaturized structure are readily apparent. In FIGS. 1–3, the bottom plate 10 may be about 44 mm square and the thickness of each layer 12 and 14 may be 0.005 mm. In FIG. 1, only the first layer 12 as applied to the bottom plate 10 is illustrated, for clarity.

From FIG. 1, then, it will be apparent that the layer 12 is patterned as indicated, to include the opposite end boundaries 17 and 18 and the intervening opposite side boundaries 20 and 22. The widths of the boundaries 16, 20 and 22 may be about 4 mm whereas the width of the end boundary 18 may be about 12 mm, except in the region of the notch 24 where it is about 4 mm. Extending from the opposite end boundary 17 and into the notch 24 are the parallel legs 26 and 28, each of about 1 mm in width and defining the bottom half of a channel 30 which is of about 2 mm in width. Where the legs 26 and 28 enter the notch 24, they define entrance passages 31 and 33 into the bottom halves of the chambers 50 and 52, each of about 2 mm in width, and the ends of the legs are spaced from the bottom of the notch 24 by about 2 mm. In addition, the pattern includes the four annular pads 32, 34, 36 and 38 for holding adhesive, each having a central opening 40 for that purpose. The resist pads are about 4 mm in diameter and their exact positioning is not critical.

The second layer 14 is identical to the first layer 12 except that it is formed on the top plate 16 which is of lesser length than the bottom plate so that the legs 26' and 28' are shorter by about 2 mm than the corresponding legs 26 and 28 of the first layer 12. Corresponding portions of the two layers are referenced by primed numbers.

The assembly is completed by registering the glass top plate 16 with its patterned resist layer 14 in position atop the bottom plate 10 with its patterned resist layer 12 so that the resist patterns are in registry, and effecting adhesion therebetween by means of spots of adhesive 48 which are received in the openings 40.

The steps of making the embodiment according to FIG. 1–3 are as follows:

1. Prepare a master drawing by computer aided design of the film pattern according to FIG. 1.
2. Reduce the master to provide a mask.
3. Spin ¼ milliliters/square inch Shipley 1690 positive resist, vapor saturated with the solvents (propylene methoxy glycol & xylene) contained in the resist, followed by baking at 100° C. for 30 minutes, all in a dust-free (particle-free) environment. This applies to both layers.
4. Expose each thin resist film layer through the mask with a 275 watt mercury lamp unfiltered at a distance of 8 inches for 10 minutes and develop with Shipley 455 potassium hydroxide developer spray applied at the rate df 10 cc per minute for 50 seconds at 500 rpm overlapping 5 seconds with distilled water rinse for 2 minutes.
5. Cure by hard baking at 140° C. for 30 minutes in a convection oven.
6. Place the samples on the ground plate between the electrodes of a parallel plate plasma system spaced one inch apart. Evacuate the chamber to 1 micron. Flush with helium at 500 millitorr for ten minutes. Change the gas to tetrafluoromethane at 500 millitorr for one minute. Excite the gas with a 100 watt rf source at 13.6 megahertz and maintain the plasma for 5 minutes. Flush with helium.
7. Dispense adhesive dots (about 10 nanoliter per dot) into openings 40 of one resist pattern.
8. Place bottom plate into recessed vacuum fixture and register top plate thereon. Place #2 glass onto top plate to cover the vacuum recess and apply vacuum to press the top and bottom plates together. Expose the assembly to uv light as above for 1 minute to cure the adhesive 48.

The process as above results in a unitary assembly which is the patterned resist disposed between the top and bottom glass plates as best seen in FIGS. 2 and 3. The fluorinating plasma treatment as noted above conditions or alters the exposed glass surface of the bottom glass plate 10 and the exposed surfaces of the developed and cured resist respectively to make the glass surface more wettable (increasing its surface energy) while rendering the resist more hydrophobic (decreasing it surface energy). The volumes of the two chambers 50 and 52 on either side of the evaluation chamber 30 are more than sufficient to accommodate the volume of a biological sample deposited at the region indicated at 54 in FIG. 3 so that the totality of the deposited sample is drawn into the capillary evaluation passage or chamber 30 and partially into the chambers 50 and 52 until meniscii are present at about the positions indicated at 56, 58 and 60 in dotted lines in FIGS. 1 and 3. This assures that very small surface areas of the liquid medium are exposed to ambient air and therefore to destructive evaporation. It also assures that the liquid phases of the contents of the chambers 30, 50 and 52 are separated while the vapor phases thereof are connected across the top edges of the legs defining the chamber 30 therebetween, as indicated at 62 and 64. It also assures that a rather precisely defined volume of the sample will almost immediately enter and fill the chamber 30 as an immobilized sample for study while the bulk of the applied sample will be drawn into and enter the chambers 50 and 52 somewhat more slowly but with the menisci forming at the positions as illustrated. The almost completely isolated sample for study in the chamber 30 is well protected against deterioration even at the body temperature (almost 100° F.) at which the sample will be maintained for study.

Figure 4:
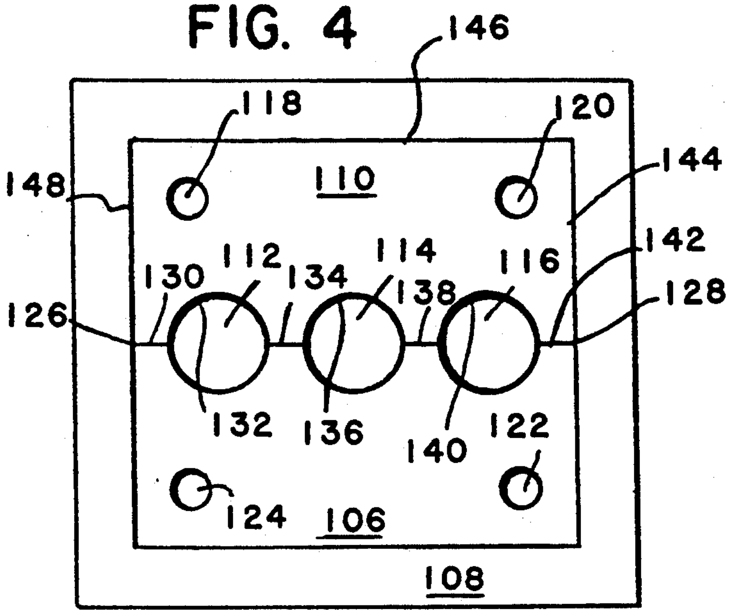
FIG. 4 is view similar to FIG. 1 but of another embodiment.
Figure 5:
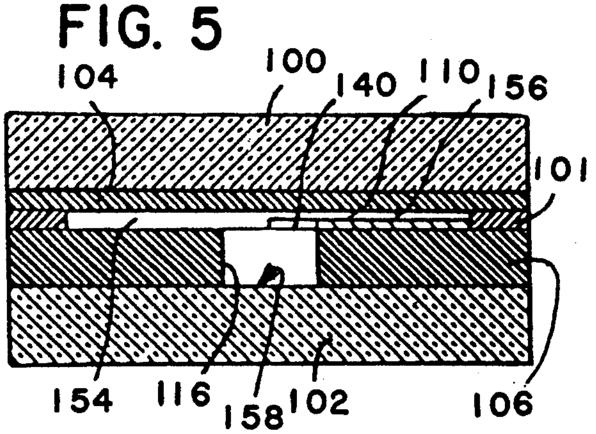
FIG. 5 is a view similar to FIG. 2 but of the other embodiment.
Figure 6:
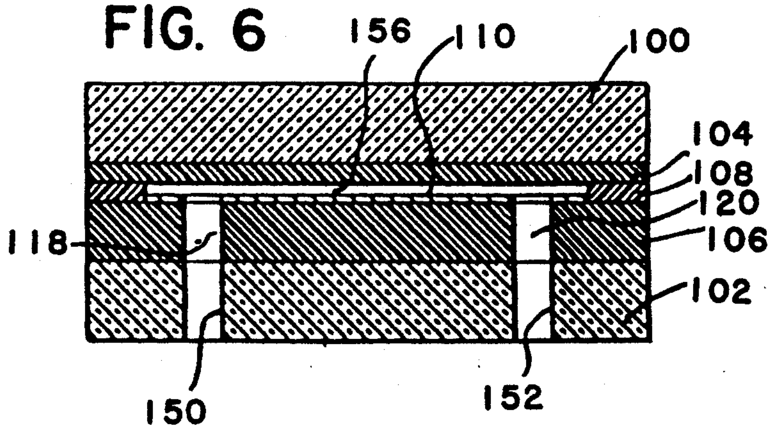
FIG. 6 is a view similar to FIG. 3 but of the other embodiment.

The embodiment according to FIGS. 4–6 is for the study of individual cells or cell cultures and includes means for nourishing or growing them. As will be evident from FIGS. 5 and 6, substantially identically sized top and bottom glass plates 100 and 102 are provided with a single resist layer 104 in the case of the top plate 100 and with three layers 106, 108 and 110 in the case of the bottom plate 102. FIG. 4 is a plan view of the bottom plate with its layers 106, 108 and 110.

The process steps for making the assembly are as follows:

1. Prepare a master drawing by computer, aided design of the pattern of holes according to FIG. 4 to make mask which is transparent in the areas of the seven circles. Prepare another master drawing of the pattern of the layer 110 in FIG. 4 to make mask 2. Prepare still another master drawing of the pattern of the layer 108 in FIG. 4 to make mask 3.

2. Reduce the masters to provide masks 1, 2 and 3.

3. Spin ¼ milliliters/square inch Shipley 1690 positive resist, vapor saturated with the solvents (propylene methoxy glycol & xylene) contained in the resist, followed by baking at 100° C. for 30 minutes, all in a dust-free (particle-free) environment. This applies only to the bottom plate and its layer 106.

4. Expose the thin resist film layer 106 through the mask 1 with a 275 watt mercury lamp unfiltered at a distance of 8 inches for 10 minutes and develop with Shipley 455 potassium hydroxide developer spray applied at the rate of 10 cc per minute for 50 seconds at 500 rpm overlapping 5 seconds with distilled water rinse for 2 minutes. The layer 106 now is patterned with openings 118, 120, 122 and 124 as w®11 as the openings 112, 114 and 116, all of which expose the glass plate 102 at this time.

5. Cure the patterned layer 106 by hard baking at 140° C. for 30 minutes in a convection oven.

6. Place the bottom plate with the patterned layer 106 in an evaporator (Polaron evaporator) 10 inches away from a tungsten wire basket containing small quantity (1 mm diameter) pure aluminum bead. Evacuate to 1 micron and pass sufficient current through the basket to evaporate the aluminum onto the patterned layer 106 and the exposed portions of the plate 102 within the circles 112, 114, 116, 118, 120, 122 and 124.

7. Apply Shipley 1375 positive resist as in 3 above to the entirety of the aluminum surface.

8. Expose the 1375 phoresist through mask 2 and develop as in 4 above, followed by etch in phosphoric-nitric acid aluminum etchant for 30 seconds followed by 2 minute distilled water rinse. Dip in acetone followed by methanol and distilled water to remove the 1375 photoresist. The aluminum now covers only the area of the layer 110, that is from the point 126 to the point 128 along the division line 130, the upper half 132 of the circle or opening 112, line 134 and so on through the upper circle halves 136 and 140 and the lines 138 and 142 and thence along the lines 144, 146 and 148.

9. Apply 1650 photoresist as in 3 above over the entire exposed surface.

10. Expose the 1650 through mask 3 and develop as in 4 above.

11. Cure as in 5.

12. Drill four holes through the bottom plate as indicated for the holes 150 and 152 in FIG. 6.

13. Apply 1350 resist as in 3 to the bottom surface of the top plate and cure as in 5 to provide the layer 104.

14. Place the top and bottoms plates on the ground electrode between the electrodes of a parallel plate plasma system spaced one inch apart. Evacuate the chamber to 1 micron. Flush with helium at 500 millitorr for ten minutes. Change the gas to tetrafluoromethane at 500 millitorr for one minute. Excite the gas with a 100 watt rf source at 13.6 megahertz and maintain the plasma for 5 minutes. Flush with helium.

When using the embodiment just described, the top plate is separated from the bottom plate in a sterile environment and an aliquot containing liquid medium and one or more cells is loaded to fill each of the wells or chambers within the layer 106, one such chamber being indicated at 158 in FIG. 5. The top plate is then placed in position on the bottom plate and clamped or otherwise secured in position thereon. A source of gas such as air mixed with 5% carbon dioxide is connected to the opening through the bottom plate corresponding to the circle 124 and is exhausted through the glass plate opening corresponding to the circle 122 to circulate the gas through the gas perfusion chamber 154. Similarly, a source of cell culture media is connected to the glass plate opening 150 and exhausted through the opening 152 to circulate the liquid media through the nutrient or reagent chamber 156.

The cell culture chambers 158 must be of a size to accommodate the original cells in the aliquot plus any cells which will grow up from the original cells during the study. Typically, these chambers may be 100 microns deep for egg cells or 20 microns deep for other types of animal cells. Therefore, the layer 106 may vary in thickness in accord with its intended use. The diameter of these chamber depends upon the number of cells to be studied in each chamber, for example typically ranging between about 250 microns and 1 centimeter. The aluminum layer normally is about 100 Angstrom units thick which will promote the wetting of the chamber 156 while allowing observations through the aluminum layer. The thickness of the layer 108 must be thin enough to impede the flow of gas into the chamber 156 and to impede the flow of media into the gas perfusion chamber 154 and blocking cells from escaping the culture chambers 158. At the same time it must be thick enough to allow proper exchange of nutrients, and cell products between the chambers 158 and 156 and gases between the chambers 158 and 154. Typically, this thickness will range between ½ micron and 10 microns. The layer 104 is thin enough to provide good visibility into the cell chambers 158 and may be any material which is thin and hydrophobic.

When miniaturized structures are formed of contiguous or adjacent materials desired to have significantly different surface energy levels, these surface energy levels are often compromised or altered from those desired and the desired characteristics cannot be restored by well known methods. In fact, well known methods when attempted tend to compromise the surface energy levels of the materials involved, usually altering the surface energy level of one material in the desired direction while having the opposite effect on the other. I have found, however, that the effect of attaining desired disparate surface energy levels can be obtained and that, furthermore, it can even be obtained simultaneously by a single treatment. Specifically, as disclosed above, the desired effect can be accomplished by subjecting the miniaturized structural assembly to fluorinating plasmas in the absence of contaminant gases such as oxygen or water. I have also found that hydrogen plasmas, under the same conditions, are effective as well.

In miniaturized structures as disclosed herein, surface energy levels as high as or greater than 100 dynes per centimeter as well as surface energy levels less than 30 dynes per centimeter are advantageous and are considered necessary and surface energy levels as high as 300 dynes per centimeter and as low as 5 dynes per centimeter may be highly desirable. In accord with this invention, surface energy levels of this nature have been simultaneously attained in structures smaller than 10 microns.

Figure 11:
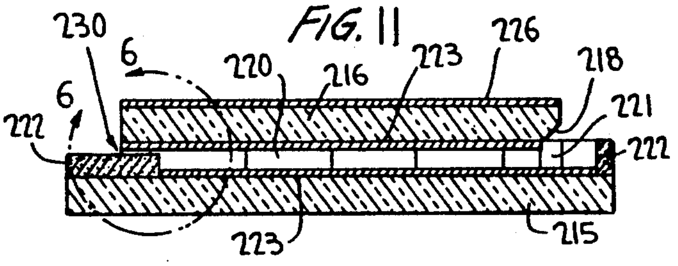
FIG. 11 is a cross-sectional view taken along line 211 of FIG. 7.
Figure 10:
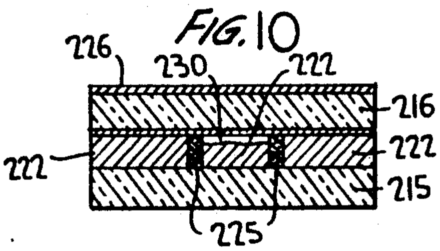
FIG. 10 is a cross-sectional view taken along line 210 of FIG. 7.
Figure 12:
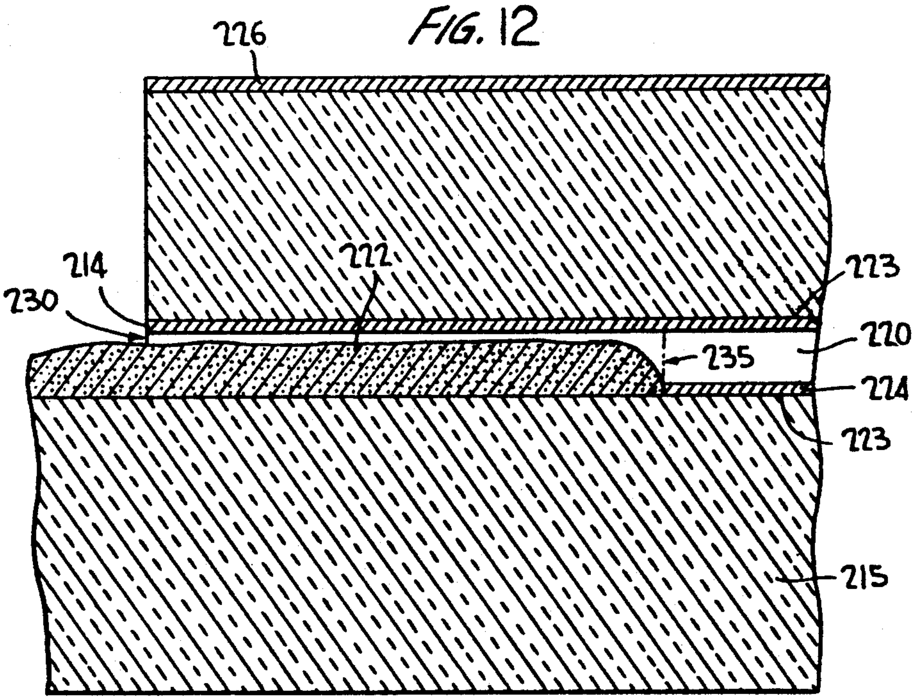
FIG. 12 is an enlarged view of area 212 as shown in FIG. 11.

Another embodiment of the present invention relates to a miniaturized assembly for containing a sample as shown in FIGS. 7-12. The assembly preferably comprises a top plate 216 and a bottom plate 215 which are separated by a distance and define top and bottom interior walls 223 of a sample evaluation chamber 220. The top plate may be smaller than the bottom plate. Preferably, the interior walls are coated with an adhesion resistant film 224 that is preferably hydrophilic. The sample should wet the film 224. Alternatively, the interior walls may be etched. Side boundaries of the chamber are defined by a patterned hydrophobic-oleophobic layer 222 which is applied to the bottom plate 215. Preferably, only the interior surface of the bottom plate 215 not coated with the patterned hydrophobic-oleophobic layer 222 is coated with the adhesion resistant film 224. As best seen in FIGS. 11 and 12, the entire interior wall 223 of the top plate 216 is preferably coated with the adhesion resistant film 224.

Figure 7:
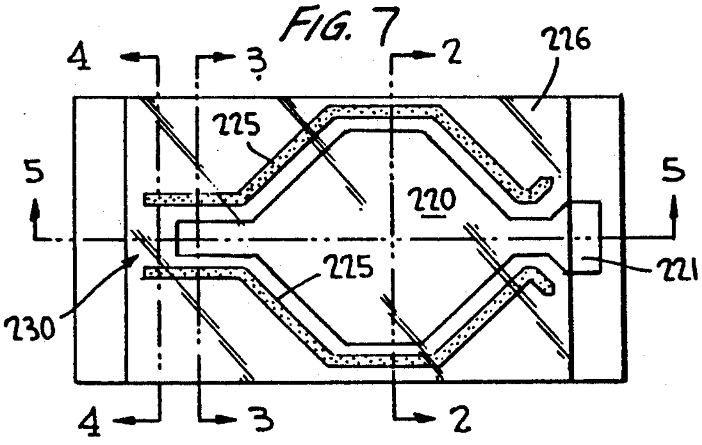
FIG. 7 is a top view of a device according to an embodiment of the present invention.
Figure 8:
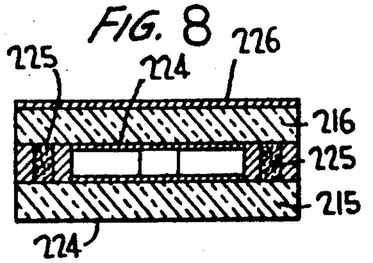
FIG. 8 is a cross-sectional view taken along line 208 of FIG. 7.
Figure 9:
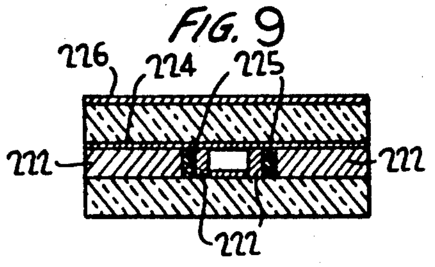
FIG. 9 is a cross-sectional view taken along line 209 of FIG. 7.

The top surface of the top plate may be coated with a hydrophobic film 226 comprising a fluoroteleomer, silane, wax or lipid film, at least in areas adjacent an introduction aperture. This protects the top plate and prevents spreading of the sample on the top plate. FIG. 7 shows an assembly according to the present invention wherein the hydrophobic film 226 is cut-away from over the chamber 220 so that the chamber 220 may be clearly seen. Also, in FIG. 7 the hydrophobic-oleophobic layer 222 is not shown underneath the hydrophobic layer 226 for the purpose of clarity, although the layer 222 is present under all areas denoted as 226 in the FIG.

The thickness of the hydrophobic-oleophobic layer 222 may vary greatly but should have a within-device, device-to-device, lot-to-lot variation of less than ±5% of a prescribed thickness. Thicknesses may range from about 0.3 micrometer or less to about 5 millimeter or more. Different methods of applying the layer may be used for different desired thicknesses of the layer. The hydrophobic-oleophobic layer 222 should also be made of such a material to provide a surface energy and surface structure to produce advancing contact angles of at least 140 degrees against water and air.

Materials for the hydrophobic-oleophobic layer may include mixtures of pigments; epoxies, especially solvent-free epoxies such as EA 121 from Norland, New Brunswick, N.J.; Teflon micropowder such as MP 1200 from DuPont, Wilmington, Del.; and fluorosurfactants such as FC 740 from 3M Corporation. A detergent such as tri-butyl phosphate may also be added as a thinner for materials for the hydrophobic-oleophobic layer.

Attachment means may be used to hold the assembly together, particularly the top plate 216 to the bottom plate 215. The attachment means preferably comprise a patterned adhesive layer 225. The adhesive layer 225 also aids in defining the side walls of the chamber 220 and forming a sample introduction aperture 221 and a vent 230.

The attachment means are not limited to an adhesive layer. Clips, bands and other suitable means may be used. Preferably, the attachment means is patterned and lies between the top and bottom plates. The attachment means may be screen-printed or ink-jet-printed onto either the top, the bottom, or both plates. If an adhesive layer is used, it may be a patterned solvent-free adhesive, a UV-curing adhesive, a pressure sensitive adhesive, a resist patterned adhesive or a melt-bonding adhesive.

The chamber 220, formed as discussed above, also has a sample introduction aperture 221 and a vent 230. The introduction aperture 221 is formed by both the patterned hydrophobic-oleophobic layer 222 and the patterned adhesive layer 225. A sample is injected into the aperture and fills the chamber 220. Preferably, the sample introduction aperture 221 has a top portion defined by an angled smoothed edge 218 of the top plate 216. The angled edge 218 limits mechanical damage to a sample during introduction to the chamber 220 through the aperture 221.

As best seen in FIG. 12, air inside the chamber 220 is displaced by an incoming sample and exits the chamber through a vent 230. The vent 230 is formed by the top plate 216 and the hydrophobic-oleophobic layer 222. The layer 222 is preferably applied in the vent region so as to form a bumpy top surface having a slight clearance from the top plate 216 or the adhesion resistant film 224 applied to the top plate. Due to the properties of the hydrophobic-oleophobic layer, a liquid sample will not pass through the vent. Instead, only gas from within the chamber exits the vent. The flow of the sample will stop within the chamber near the area 235 shown in FIG. 12.

The top and bottom plates should be transparent to ultraviolet and/or visible light and they should be optically flat. Preferably, the plates are optically flat to less than 1 micrometer per cm. At least one of the plates should be sufficiently thin so as to allow proper focus by a microscope over its depth in field beyond the opposite side of the plate. The plates preferably have a precise and sufficient thickness and modulus so as to deflect less than five percent of the chamber depth when subject to capillary forces created by the presence of a sample between the plates. The interior walls of the plates should have a proper electrostatic surface charge to limit adhesion of the sample. As discussed above, the walls may be etched or coated with an adhesion resistant film to provide such a charge. The adhesion resistant film may be a transparent hydrophilic thin coating.

The size of the assemblies and chambers according to the present invention may greatly vary. Volumes are not limited but should be consistent from device-to-device and lot-to-lot with strict variation limitations. Slight under filling of the capillary chamber minimizes contamination and drying of liquid sample yet increases negative capillary pressure. It is important to limit and/or know the deflection of the plates under such pressure in order to accurately evaluate the sample.

In considering this invention, the above disclosure is intended to be illustrative only and the scope and coverage of the invention should be construed and determined by the following claims.

What is claimed is:

1. A miniaturized biological assembly for containing a sample of microscopic-sized particulate biological material in a fluid medium to enable quantitative microscopic examination thereof, said assembly comprising first and second plates which are disposed in registry with one another and adhered to one another, at least one patterned layer located between said first and second plates to define at least one chamber between said first and second plates for a sample of particulate biological material in a fluid medium and to define a boundary which minimizes contamination and drying of liquid sample and protects liquid sample against deterioration at temperatures at which liquid sample is maintained for study, said at least one chamber having a depth dimension between said first and second plates which enables all particulate biological material therein to be viewed within a particular depth of field characteristic of a microscope, attachment means to fixedly position said first and second plates together with said at least one patterned layer therebetween, and a plurality of annular pads located within said at least one chamber and extending between said first and second plates, and wherein said attachment means comprises adhesive within said annular pads to adhere said first and second plates together.

2. A miniaturized biological assembly for containing a sample of microscopic-sized particulate biological material in a fluid medium to enable quantitative microscopic examination thereof, said assembly comprising first and second plates which are disposed in registry with one another and adhered to one another, at least one patterned layer located between said first and second plates to define at least one chamber between said first and second plates for a sample of particulate biological material in a fluid medium and to define a boundary which minimizes contamination and drying of liquid sample and protects liquid sample against deterioration at temperatures at which liquid sample is maintained for study, said at least one chamber having a depth dimension between said first and second plates which enables all particulate biological material therein to be viewed within a particular depth of field characteristic of a microscope, and attachment means to fixedly position said first and second plates together with said at least one patterned layer therebetween, wherein said at least one patterned layer defines a first end boundary having a notch, opposite side boundaries, a second end boundary opposite said first end boundary, and two parallel legs which extend from said second end boundary into said notch so as to define a sample channel between said two legs and first and second sample chambers on opposite sides of said legs.

3. A miniaturized biological assembly as defined in claim 2, wherein said second plate has a smaller length than said first plate so that said notch is exposed to an environment around said miniaturized assembly and provides an aperture for supply of sample to said sample channel and said first and second sample chambers.

4. A miniaturized biological assembly as defined in claim 3, wherein said sample channel has a width of about 2 mm and said legs define entrance passages to said first and second sample chambers having widths of about 2 mm.

5. A miniaturized biological assembly for containing a sample of microscopic-sized particulate biological material in a fluid medium to enable quantitative microscopic examination thereof, said assembly comprising first and second plates which are disposed in registry with one another and adhered to one another, at least one patterned layer located between said first and second plates to define at least one chamber between said first and second plates for a sample of particulate biological material in a fluid medium and to define a boundary which minimizes contamination and drying of liquid sample and protects liquid sample against deterioration at temperatures at which liquid sample is maintained for study, said at least one chamber having a depth dimension between said first and second plates which enable all particulate biological material therein to be viewed within a particular depth of field characteristic of a microscope, and attachment means to fixedly position said first and second plates together with said at least one patterned layer therebetween, wherein said at least one patterned layer is a patterned resist.

6. A miniaturized assembly for containing a sample of liquid or microscopic-sized particulate biological or chemical material in a fluid medium to enable microscopic examination thereof, said assembly comprising:

first and second plates which are disposed in registry with one another, at least one of said plates being sufficiently thin so as to allow proper focus by a microscope having a particular depth of focus over a depth of field thereof beyond an opposite side of said at least one of said plates, said first and second plates having a precise and sufficient thickness and modulus to provide a specific maximum deflection due to capillary forces created by the presence of a sample between said plates, the surfaces of said plates having proper electrostatic surface charge to limit adhesion of a sample, and said plates being free of particulate and chemical contamination;

at least one hydrophobic-oleophobic layer located in registry between said first and second plates to define at least one chamber for a sample, said at least one chamber formed by said at least one hydrophobic-oleophobic layer and opposed surfaces of said first and second plates, said at least one hydrophobic-oleophobic layer having a prescribed and accurate depth dimension, said depth dimension enabling all particulate material therein to be viewed within a depth of field characteristic of a microscope, said at least one hydrophobic-oleophobic layer also defining an aperture leading to said at least one chamber from the edge of at least one of said plates for the introduction of a sample into said at least one chamber, said at least one hydrophobic-oleophobic layer further defining at lest one channel for the venting of air displaced from said at least one chamber as it is filled with a sample, said at least one hydrophobic-oleophobic layer surrounding said at least one chamber and at least one channel to permit the escape of air trapped in said at least one chamber while preventing the flow of a sample through said at least one channel.

7. A miniaturized assembly as defined in claim 6, wherein at least one of said first and second plates is transparent to ultraviolet and/or visible light.

8. A miniaturized assembly as defined in claim 6, wherein at least one of said first and second plates is optically flat to less than 1 micrometer per cm.

9. A miniaturized assembly as defined in claim 6, wherein at least one of said first and second plates is angled at an edge opposing the surface of the other plate to form said aperture.

10. A miniaturized assembly as defined in claim 6, wherein attachment means are provided between the interior surfaces of the first and second plates.

11. A miniaturized assembly as define din claim 6, wherein a thin coating of hydrophobic material is adhered to at least portions of the exterior-facing surface of said first plate adjacent to said introduction aperture.

12. A miniaturized assembly as defined in claim 6, further including an attachment means to fixedly position said first and second plates together with said at least one hydrophobic-oleophobic layer therebetween, said attachment means providing a vapor seal at the perimeter of said at least one chamber except at said entrance aperture and said at least one vent channel, said attachment means restricting the size of said at least one vent channel to control the out-flow of air displaced from said at least one sample chamber by the introduction of a sample.

13. A miniaturized assembly as defined in claim 12, wherein said attachment means is disposed in registry with said first and second plates and said at least one hydrophobic-oleophobic layer to fixedly position said first and second plates together with said at least one hydrophobic-oleophobic layer therebetween, said attachment means being at least one member selected from the group consisting of screen-printed, ink-jet-printed attachment means and uv curable, pressure sensitive, solvent-free and melt-bonding adhesives.

14. A miniaturized assembly as defined in claim 6, further including a patterned transparent hydrophobic thin coating adhered to said at least one chamber surface of said first and second plates having properties that further limit the adhesion of a sample.

15. A miniaturized assembly as defined in claim 6, including at least one of said first and second plates smoothed to a radius of 5 to 50 micrometers at the edge opposing the surface of the other plate to limit mechanical damage to a sample during introduction through said aperture.

16. A miniaturized assembly as defined in claim 6, wherein said at least one hydrophobic-oleophobic layer has a surface energy and surface structure to produce an advancing contact angle of at least 140 degrees against water and air.

17. A miniaturized assembly as defined in claim 6, including a patterned layer having a specific predetermined thickness and having within-device, device-to-device, and lot-to-lot variation of less than ±5% of a prescribed thickness.

* * * * *